No. 791,991. PATENTED JUNE 6, 1905.
G. T. REED.
RUBBER TIRE FASTENER FOR WHEELS.
APPLICATION FILED SEPT. 6, 1904.
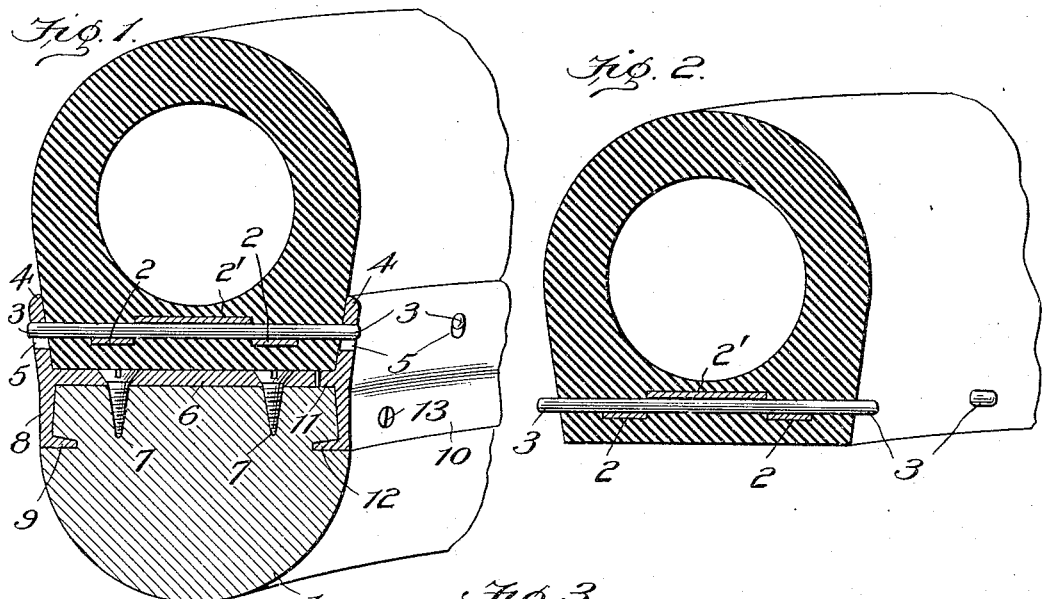
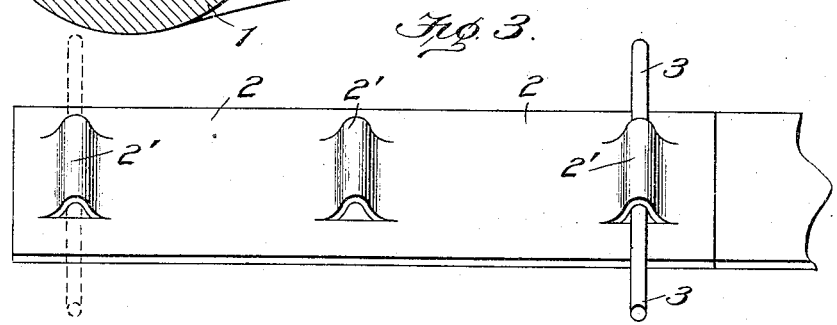
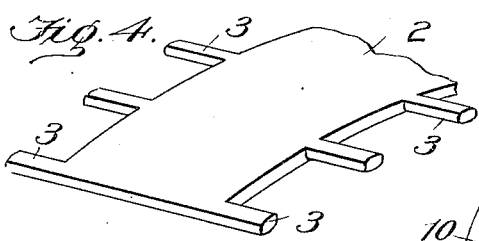
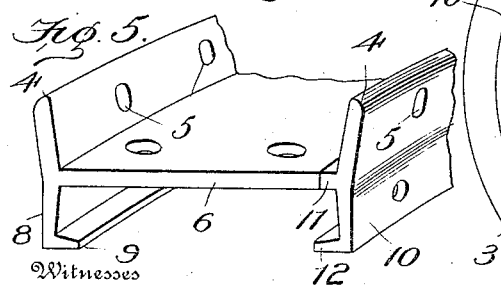
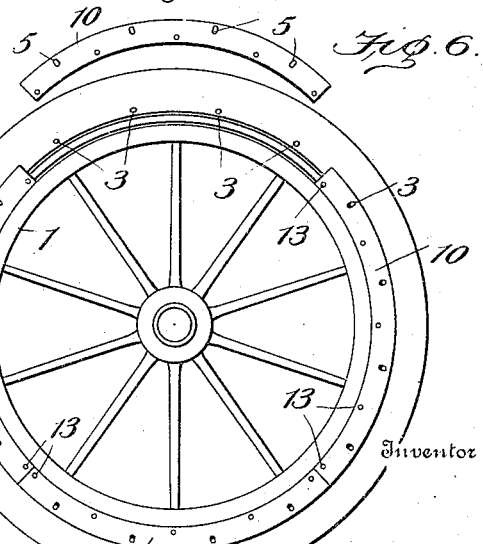
Witnesses
Edwin L. Bradford
Anne B. Johnson
Inventor
George Thorn Reed
By Johnson & Johnson
Attorneys No. 791,991. Patented June 6, 1905.

UNITED STATES PATENT OFFICE.

GEORGE THORN REED, OF BALTIMORE, MARYLAND, ASSIGNOR OF ONE-THIRD TO ALBERT H. BEIMSCHLA, OF BALTIMORE, MARYLAND.

RUBBER-TIRE FASTENER FOR WHEELS.

SPECIFICATION forming part of Letters Patent No. 791,991, dated June 6, 1905.

Application filed September 6, 1904. Serial No. 223,464.

*To all whom it may concern:*

Be it known that I, GEORGE THORN REED, a citizen of the United States, residing at Baltimore city, State of Maryland, have invented certain new and useful Improvements in Rubber-Tire Fasteners for Wheels; and I do hereby declare the following to be a full, clear, and exact description of the invention, such as will enable others skilled in the art to which it appertains to make and use the same.

For supporting and fastening rubber tires to the rims or fellies of bicycle or automobile wheels I have designed a rubber tire having novel means of securing it to the wheel-rim and adapting the same means to render the base of the tire stiff and durable.

An essential feature of my invention resides in a binder-plate embedded in the base of the tire and having provision projecting through and beyond the sides of the tire for engagement with means whereby said embedded binder-plate is secured to the sides of a tire seating and supporting or housing plate as a means of securing the tire within and upon its support and to the wheel-rim. An advantage of this construction is that the tire is secured directly to the sides of its housing-plates by means embedded in the base of the tire.

The accompanying drawings illustrate my invention in the form in which I prefer to employ it; but it will be understood that my invention is not limited to the precise form and construction herein shown and described, as changes may be made without exceeding the scope of the invention or the claims in which it is set out.

Referring to the drawings, Figure 1 shows in cross-section the rubber tire, the wheel-rim, and their connecting parts embodying my invention, a portion of these parts being extended in perspective. Fig. 2 is a cross-section of the rubber tire, showing a portion extended in perspective to illustrate its embedded side arms or rods by which it is locked to the rim. Fig. 3 shows in perspective a portion of an armed binder-plate which being embedded in the base of the tire is the means of securing the tire to its housing-support. Fig. 4 shows a modification of the armed binder-plate. Fig. 5 shows a portion of the channel-plates which form the support and housing for the tire. Fig. 6 shows a rubber-tired wheel in elevation embodying my invention.

The wheel rim or felly 1 has a flat periphery and may otherwise be of any desired construction and material. The rubber tire is an unbroken circle, has a flat base, and may be of the pneumatic or solid-cushion type. The base of the tire has molded therein a binder-plate 2, formed in sections, each section having arms or rods 3, preferably at right angles to the edges of said sections and extending through and beyond the side walls of the tire. The sections may be of any suitable length, with their ends abutting as in Fig. 3, and of less width than the tire, so as to form a sort of skeleton web with the ends of the arms or rods projecting beyond the sides of the tire. The tire is seated between the sides of the channel-plates, which are secured to the rim or felly, and the sides 4 4 of these plates are provided with perforations 5, made to register with and engage the projecting ends of the arms or rods. One of the channel-plates has a web 6 nearly the width of the rim and to which said web is secured by screws 7, while a plate 8, extending inward from the web, has a flange 9, which is driven into a groove in the side of the rim. The other side channel-plate 10 is made separate and, like that described, has perforations 5, made to register with and engage the projecting rods or arms 3 of the binder-plate. This side plate 10 also extends inward from its web 11 and has a flange 12, which is driven into a groove in the side of the rim, and this plate is secured to the rim by screws 13. Both channel-plates are thus secured to the wheel-rim, and both are engaged with the embedded armed plate of the tire, securing it to the rim, so that however forcible may be a side thrust of the tire it cannot be displaced from its seating. As a heavy weight will cause the compression of the tire in its seating, the perforations in the channel-plates may be of oblong form to allow slight movement of the arms with the compression of the base. An important advantage of these side external locking rods or arms is that the tire may be seated and locked in its housing without trouble.

The tire being molded with metal binder-plate and the latter provided with rods or arms projecting from the sides of the plate and the rim produced complete, with a channel-plate fixed on one side, it is only necessary to seat the tire and push the projecting ends of the rods or arms into engagement with the perforations of said channel-plate. The channel-plate sections 10 on the other side are then engaged with the projecting ends of the rods or arms and secured to the rim by the flange and the screws. It is important to note that the binder-plate, with a portion of the length of its rods or arms, forms a skeleton web within the base of the tire, so as not to impair the integrity of the tire or its elasticity.

Of the two forms of the armed binder-plate shown I prefer the construction in which its locking elements are formed of separate rods, which are engaged with loops or perforated projections struck up from the plate, so as to form transverse openings or eyes through which the rods may be driven to secure them to the binder-plate with their ends projecting from both sides of the tire for engagement with the perforations in the channel-plates. It will be understood that these separate rods are of steel and are driven through the tire from one side and into and through the loops of the binder-plate and through the other side of the tire, so that their projecting ends will be smooth and round to readily engage themselves in the holes of the channel-plates. As shown in Fig. 4, the binder-plate and its locking-arms are integral and molded in the tire, with the ends of its arms projecting at the sides of the tire, so as to have a locking engagement with the side channel-plates. The channel-plate 4 10 is a ring of sections affording convenience for setting and securing them in place.

As a new article of manufacture the tire can be furnished the trade with its embedded binder-plate and arms.

I claim—

1. As a new article of manufacture, a rubber tire for wheels having binder-plates provided with rods or arms passing through and projecting beyond each side of the base at intervals around the tire and molded with said plates within its base.

2. A rubber tire for wheels having binder-plates, provided with rods or arms passing through the walls of the base on each side at intervals around the tire and molded with said plates within its base, a wheel-rim, and means secured thereto and adapted to engage the ends of the side projecting rods of the binder-plate.

3. A rubber tire for wheels having binder-plates, provided with rods or arms passing through the walls of the base on each side at intervals around the tire and molded with said plates within its base, a wheel-rim, and side channel-plates secured to the rim and engaging the projecting rods or arms of the binder-plates.

4. A rubber tire for wheels having binder-plates, provided with rods or arms passing through the walls of the base on each side at intervals around the tire and molded with said plates within its base, a wheel-rim, and channel-plates secured to the rim and having slots for engaging the projecting ends of the armed binder-plates.

5. A rubber tire, binder-plates provided with rods or arms, said plates and arms molded within the base of the tire, and the rods passing through the side walls of the base at intervals around the tire, a wheel-rim, and means secured thereto and adapted to engage the projecting ends of said rods or arms, whereby to form a skeleton binder and fastener in said base.

6. In combination with a rubber tire, binder-plates each having integral loops, or eyes projecting from its surface at intervals and molded as a sectional ring in the base of the tire.

7. A rubber tire for wheels in combination with a binder-plate embedded in its base and having loops or eyes projecting from its surface, and rods driven through the tire-base in engagement with the loops of the binder-plate and projecting at both sides of the tire.

8. A rubber tire for wheels in combination with a binder-plate embedded in the base of the tire, and composed of a ring of abutting sections, each section having one or more arms projecting from its edges and extending through and beyond the sides of the tire.

9. A rubber tire for wheels, a binder-plate embedded in the base of the tire and composed of a ring of abutting sections, each section having a plurality of arms projecting through and beyond the sides of the tire, and means secured to the rim having openings registering with and adapted to engage the binder-arms.

10. A rubber tire for wheels having binder-plates embedded in the base of the tire and formed with loops or eyes projecting from its surface, in combination with rods driven through the tire and engaging the binder-loops, and means carried by the wheel for engaging the ends of said rods.

11. In a rubber tire for wheels, the tire, a wheel-rim and means for securing the tire to the rim consisting of a ring channel-plate having a web secured at one side and to the circumference of the wheel-rim, and a ring channel-plate of abutting sections secured at the other side of the rim, and means molded within the tire for engaging and securing it to said plates.

12. In a rubber tire for wheels, the tire, and the wheel-rim, and means for securing them together consisting of binder-plates provided with rods or arms passing through the tire-base, projecting at each side thereof and molded with said plates within said base, a ring channel-plate having a web, means for securing said web to said rim, means for securing said channel-plate to the side of said rim, and perforations in said channel-plate adapted to freely engage the projecting ends of said rods, a channel-plate of segments having perforations adapted to freely engage the projecting ends of the rods on the other side of the tire and means for securing said segments to the rim.

In testimony whereof I have signed my name to this specification in the presence of two subscribing witnesses.

GEORGE THORN REED.

Witnesses:
HORACE S. WHITMAN,
JAMES JENKINS.